(12) United States Patent
Paulley

(10) Patent No.: US 6,516,310 B2
(45) Date of Patent: Feb. 4, 2003

(54) SYSTEM AND METHODOLOGY FOR JOIN ENUMERATION IN A MEMORY-CONSTRAINED ENVIRONMENT

(75) Inventor: Glenn Norman Paulley, Waterloo (CA)

(73) Assignee: Sybase, Inc., Dublin, CA (US)

( * ) Notice: Subject to any disclaimer, the term of this patent is extended or adjusted under 35 U.S.C. 154(b) by 257 days.

(21) Appl. No.: 09/732,499

(22) Filed: Dec. 6, 2000

(65) Prior Publication Data

US 2002/0116357 A1 Aug. 22, 2002

Related U.S. Application Data

(60) Provisional application No. 60/169,547, filed on Dec. 7, 1999.

(51) Int. Cl.[7] .............................................. G06F 17/30
(52) U.S. Cl. ................................................ 707/2; 707/3
(58) Field of Search ................................ 707/1, 2, 3, 4, 707/5, 10, 104.1; 356/521; 709/101; 710/62; 705/3; 379/93.25

(56) References Cited

U.S. PATENT DOCUMENTS

| | | | | |
|---|---|---|---|---|
| 4,799,254 A | | 1/1989 | Dayton et al. ............ 379/93.25 |
| 5,291,399 A | | 3/1994 | Chaco ............................ 705/3 |
| 5,367,675 A | * | 11/1994 | Cheng et al. .................. 707/2 |
| 5,664,228 A | | 9/1997 | Mital ............................ 710/62 |
| 5,668,987 A | | 9/1997 | Schneider .................... 707/13 |
| 5,671,404 A | | 9/1997 | Lizee et al. .................... 707/5 |
| 5,694,601 A | | 12/1997 | White ........................ 709/101 |
| 5,812,996 A | * | 9/1998 | Rubin et al. .................... 707/2 |
| 5,819,066 A | | 10/1998 | Bromberg et al. ........... 356/521 |
| 5,822,749 A | * | 10/1998 | Agarwal ......................... 707/2 |
| 5,822,750 A | | 10/1998 | Jou et al. ......................... 707/2 |
| 5,826,077 A | | 10/1998 | Blakeley et al. ................ 707/4 |
| 5,950,190 A | | 9/1999 | Yeager et al. ................... 707/3 |
| 6,112,198 A | * | 8/2000 | Lohman et al. ................. 707/3 |
| 6,263,345 B1 | * | 7/2001 | Farrar et al. ............. 707/104.1 |
| 6,339,768 B1 | * | 1/2002 | Leung et al. ................... 707/2 |
| 6,397,204 B1 | * | 5/2002 | Liu et al. ........................ 707/2 |

* cited by examiner

Primary Examiner—Diane D. Mizrahi
Assistant Examiner—Yicun Wu
(74) Attorney, Agent, or Firm—John A. Smart

(57) ABSTRACT

A small-footprint relational database system providing a deterministic join enumeration methodology for left-deep processing trees is described. By providing a deterministic branch-and-bound join enumeration method for left-deep processing trees, the invention is able to efficiently optimize complex queries with high join degree by employing a novel approach to cost-based pruning of the search space. For each subquery, plan generation involves the following four distinct steps. First, the system adjusts predicate selectivities to account for disjuncts, Between predicates, and user estimates of selectivities. Next, the system constructs a join graph for the query that models inner and outer equijoin predicates, sargable single-variable predicates on single quantifiers, and Cartesian products. The system then enumerates join strategies and prune the search space using a branch-and-bound heuristic. Finally, the system recalls the cheapest strategy and constructs the detailed access plan for that strategy. Empirical performance results on several production queries show that this approach requires significantly less memory than other deterministic join enumeration approaches, which have been described in the literature.

1 Claim, 7 Drawing Sheets

SYSTEM AND METHODOLOGY FOR JOIN ENUMERATION IN A MEMORY-CONSTRAINED ENVIRONMENT

RELATED APPLICATIONS

The present application is related to and claims the benefit of priority from commonly-owned U.S. provisional application Ser. No. 60/169,547, filed Dec. 7, 1999, entitled SYSTEM AND METHODOLOGY FOR JOIN ENUMERATION IN A MEMORY-CONSTRAINED ENVIRONMENT, the disclosure of which (including any attachments and appendices thereof) is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to access and processing of information in a data processing system embodied, at least in part, in portable devices.

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level.

The general construction and operation of a database management system is known in the art. See e.g., Date, C., *An Introduction to Database Systems,* Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server), to form a client/server database system. In operation, clients issue one or more query language (e.g., SQL) commands to the server. A query language is a specialized language for accessing or processing information from a database. SQL commands may, for instance, specify a query for retrieving particular data (i.e., data records meeting the query condition) from a database table. The syntax of SQL (Structured Query Language) is well documented; see, e.g., the abovementioned *An Introduction to Database Systems*. As used herein, "SQL" shall also include vendor-specific variants of SQL, such as Sybase® Transact-SQL. In addition to retrieving the data from database server tables, the clients also include the ability to insert new rows of data records into the table; clients can also modify and/or delete existing records in the table. Commercial examples of these "client/server" systems include Powersoft™ clients connected to one or more Sybase Adaptive Server™ database servers. Both Powersoft™ and Sybase Adaptive Server™ (formerly Sybase SQL Server™) are available from Sybase, Inc. of Emeryville, Calif.

In today's computing environment, database technology can be found on virtually any device, from traditional mainframe computers to cellular phones. Sophisticated applications, whether enterprise information portals or sales force automation systems, can "push" much of their complexity into the database itself. Indeed, this represents one of the main benefits of database technology. The challenge, however, is to support these complex applications, and the queries they generate, on small computing devices. At the same time, users expect the productivity and reliability advantages of using an SQL database, while maintaining the size and performance advantages of hand-coded applications.

Consider, for instance, the execution of an SQL request or query. A query "optimizer" in a relational DBMS is responsible for transforming an SQL request into an access plan composed of specific implementations of the algebraic operators selection, projection, join, and so on. Typically, this is done by generating many different join strategies, evaluating the cost of each, and selecting the access plan with the lowest overall cost, where "cost" is a metric that measures a combination of factors, including but not limited to the estimated amount of computational overhead, number of physical I/O operations, and response time. The process of generating these alternative join strategies is termed "join enumeration." However, producing an optimal access plan for an arbitrary SQL query is an NP-complete problem (see, e.g., Ibaraki, T. and Kameda, T., "On the optimal nesting order for computing n-relational joins", ACM Transactions on Database Systems, 9(3): 482–502, September 1984; Ono, K. and Lohman, G. M., "Measuring the complexity of join enumeration in query optimization", Proceedings of the 16th International Conference on Very Large Data Bases, pp. 314–325, Brisbane, Australia, August 1990, Morgan Kaufmann; Ozsu, M. T. and Valdariez, P., "Principles of Distributed Database Systems", Prentice-Hall, Englewood Cliffs, New Jersey, 1991; Steinbrunn, M., et. al., "Heuristic and randomized optimization for the join ordering problem", The VLDB Journal, 6(3): 191–208, August 1997), to discover an optimal strategy requires an exhaustive search. Consequently, optimizers often use heuristics (see, e.g., Ono, K. and Lohman, G. M. above; Steinbrunn, M., et. al. above; Ullman, J. D., "Principles of Database and Knowledge-Base Systems, Volume 2", Computer Science Press, Rockville, Md., 1989) to reduce the number of strategies that the plan selection phase must consider.

A common heuristic used in most commercial optimizers is to restrict the strategy space to those that perform unary operations (particularly restriction) first, thus reducing the size of intermediate results. See, e.g., Smith, J. M. and Chang, P. Y.-T., "Optimizing the performance of a relational algebra database interface", Communications of the ACM, 18(10): 568–579, October 1975; Ullman, J. D. above. Another common optimization heuristic, and one used by IBM's STARBURST, is to defer the evaluation of any Cartesian products to as late in the strategy as possible. See, e.g., Morishita, S., "Avoiding Cartesian products for multiple joins", Journal of the ACM, 44(1): 57–85, January 1997; Ono, K. and Lohman, G. M. above. To further reduce the number of alternative plans, an optimizer may consider only left-deep processing trees. See, e.g., Cluet, S. and Moerkotte, G., "On the complexity of generating optimal left-deep processing trees with cross products", Proceedings of the Fifth International Conference on Database Theory—ICDT 1995, pp. 54–67, Prague, Czech Republic, January 1995, Springer-Verlag; Ibaraki, T. and Kameda, T. above; Selinger, P. G., et. al., "Access path selection in a relational database management system", ACM SIGMOD International Conference on Management of Data, pp. 23–34, Boston, Mass., May 1979. For SPJ queries a left-deep processing tree is one where the right child of any join must be a base table. For more complex queries, a left-deep tree means that the right child of any binary operator cannot be a join, though it could be the (possibly materialized) result of a view or table expression containing Union, Group by, or aggregation. Left-deep trees are desirable because (1) they reduce the need to materialize intermediate results, (2) for several types of join implementations they result in more efficient execution plans, and (3) the space of "bushy" plans is considerably larger, and hence more expensive to search. See, e.g., Vance, B. and Maier, D., "Rapid bushy join-order optimization with Cartesian products", ACM SIGMOD International Conference on Management of Data, pp. 35–46, Montreal, Quebec, June 1996, Association of Computing Machinery. In the worst case, a completely connected join graph for a query with n quantifiers has n! alternative strategies with left-deep trees, and $(2n-2)!/(n-1)!$ alternatives when considering bushy processing trees. See, e.g., Pellenkoft, A., et. al., "The complexity of transformation-based join enumeration", Proceedings of the 23rd International Conference on Very Large Data Bases, pp. 306–315, Athens, Greece, August 1997, Morgan-Kaufmann.

Restricting the optimization space to left-deep trees still results in an NP-complete problem for queries of arbitrary complexity. See, e.g., Cluett, S. and Moerkotte, G. above; Ibaraki, T. and Kameda, T. above. Ono and Lohman (see, e.g., Ono, K. and Lohman, G. M. above) gave a lower bound of $O(3n)$, with n the number of quantifiers, on the complexity. Vance and Maier (see, e.g., Pellenkoft, A., et. al. above; Vance, B. and Maier, D. above) show that bottom-up evaluation of alternatives does not achieve this lower bound in all cases; they give a complexity of $O(4n)$ of join enumeration for the deterministic dynamic programming technique used by IBM's System R (see, e.g., Selinger, P. G., et. al. above) and STARBURST. See, e.g., Ioannidis, Y. E. and Kang, Y. C., "Randomized algorithms for optimizing large join queries", ACM SIGMOD International Conference on Management of Data, pp. 312–321, Atlantic City, N.J., May 1990. Moreover, join enumeration is notorious for its space utilization (see, e.g., Kabra, N. and DeWitt, D. J., "OPT++: An object-oriented implementation for extensible database query optimization", The VLDB Journal, 8(1): 55–78, May 1999; Pellenkoft, A., "Probabilistic and Transformation-based Query Optimization", PhD Thesis, Wiskunde en Informatica, CWI, Amsterdam, The Netherlands, November, 1997; Scheufele, W. and Moerkotte, G., "Efficient dynamic programming algorithms for ordering expensive joins and selections", Advances in Database Technology—EDBT 1998, Proceedings of the 6th International Conference on Extending Database Technology, pp. 201–215, Springer-Verlag, Valencia, Spain, March 1998), particularly because dynamic programming approaches require the memorization of partial access plans.

A recent survey by Steinbrunn, Moerkotte, and Kemper classifies join enumeration algorithms into four categories: randomized algorithms, genetic algorithms, deterministic algorithms, and hybrid algorithms. Randomized algorithms view solutions as points in a solution space; they randomly "walk" through this solution space from one point to another using a pre-defined set of moves. Two well-known examples of randomized approaches include iterative improvement (see, e.g., Ioannidis, Y. E. and Kang, Y. C. above; Swami, A., "Optimization of large join queries: Combining heuristics and combinatorial techniques", ACM SIGMOD International Conference on Management of Data, Portland, Oreg., June 1989; Swami, A. and Gupta, A., "Optimization of large join queries", ACM SIGMOD International Conference on Management of Data, pp. 8–17, Chicago, Ill., June 1988) and simulated annealing. See, e.g., Ioannidis, Y. E. and Wong, E., "Query optimization by simulated annealing", ACM SIGMOD International Conference on Management of Data, pp. 9–22, San Francisco, Calif., May 1987; Swami, A. and Gupta, A. above. Galindo-Legaria, Pellenkoft, and Kersten (see, e.g., Galindo-Legaria, C., et. al., "Randomized join-order selection: Why use transformations?", Proceedings of the 20th International Conference on Very Large Data Bases, pp. 85–95, Santiago, Chile, September 1994, Morgan-Kaufmann; Galindo-Legaria, C. A., et. al., "Uniformly-distributed random generation of join orders", Proceedings of the Fifth International Conference on Database Theory—ICDT 1995, pp. 280–293, Prague, Czech Republic, January 1995, Springer-Verlag) have recently proposed a hybrid approach that randomly "probes" the space of all valid join strategies in an attempt to quickly find a "reasonable" plan, whose cost can then be used to limit a deterministic search of the entire strategy space. Purely randomized algorithms offer at least one advantage over deterministic ones: memorization of any strategy (or portion thereof) is unnecessary, so the memory requirement is fixed.

Several deterministic join enumeration algorithms have appeared in the literature. INGRES uses a dynamic optimization algorithm (see, e.g., Kooi, R. P., "The Optimization of Queries in Relational Databases", PhD Thesis, Case Western Reserve University, Cleveland, Ohio, September 1980; Wong, E. and Youssefi, K., "Decomposition—A strategy for query processing", ACM Transactions on Database Systems, 1(3): 223–241, September 1976) that recursively breaks up a calculus (QUEL) query into smaller pieces by decomposing queries over multiple relations into a sequence of queries having one relation (tuple variable) in common, using as a basis the estimated cardinality of each. Each single-relation query is optimized by assessing the access paths and statistical information for that relation in isolation. Ibaraki and Kameda (see, e.g., Ibaraki, T. and Kameda, T. above) showed that it is possible to compute the optimal join strategy in polynomial time, given certain restrictions on the query graph and properties of the cost model. Krishnamurthy et al. (see, e.g., Krishnamurthy, R., et. al., "Optimization of nonrecursive queries", Proceedings of the 12th International Conference on Very Large Data Bases, pp. 128–137, Kyoto, Japan, August 1986, Morgan Kaufmann) proposed a polynomial-time algorithm that provides an optimal solution, though it can handle only a simplified cost model and is restricted to nested-loop joins. Swami and Iyer (see, e.g., Swami, A. and Iyer, B., "A polynomial time algorithm for optimizing join queries", Proceedings, Ninth IEEE International Conference on Data Engineering, pp. 345–354, IEEE Computer Society Press, April 1993) subsequently extended their work in an attempt to remove some of its restrictions, and to also consider access plans containing sort-merge joins. Cluet and Moerkotte (see, e.g., Cluet, S. and Moerkotte, G. above) recently showed that generating an optimal left-deep processing tree possibly containing Cartesian products for "star" queries is also NP-complete.

An NP-complete problem is any one of a class of computational problems for which no efficient solution algorithm has been found. Many significant computer-science problems belong to this class, including graph covering problems. In contrast, so-called easy, or tractable, problems can be solved by computer algorithms that run in polynomial time; i.e., for a problem of size n, the time or number of steps needed to find the solution is a polynomial function of n. Algorithms for solving hard, or intractable, problems, on the other hand, require times that are exponential functions of the problem size n. Polynomial-time algorithms are considered to be efficient, while exponential-time algorithms are considered inefficient, because the execution times of the latter grow much more rapidly as the problem size increases.

A problem is called NP (nondeterministic polynomial) if its solution (if one exists) can be guessed and verified in polynomial time; nondeterministic means that no particular rule is followed to make the guess. If a problem is NP and all other NP problems are polynomial-time reducible to it, the problem is NP-complete. Thus, finding an efficient algorithm for any NP-complete problem implies that an efficient algorithm can be found for all such problems, since any problem belonging to this class can be recast into any other member of the class. It is not known whether any polynomial-time algorithms will ever be found for NP-complete problems, and determining whether these problems are tractable or intractable remains one of the most important questions in theoretical computer science. When an NP-complete problem must be solved, one approach is to use a polynomial algorithm to approximate the solution; the answer thus obtained will not necessarily be optimal but will be reasonably close.

The best example of a deterministic algorithm is dynamic programming, the "classical" join enumeration algorithm used by SYSTEM R. See, e.g., Selinger, P. G., et. al. above. It performs static query optimization by searching the solution space using a modified dynamic programming approach. See, e.g., Ono, K. and Lohman, G. M. above; Selinger, P. G., et. al. above. The optimizer assigns a cost to every candidate access plan, and retains the one with the lowest cost. In addition, the algorithm keeps track of the "sorted-ness" of each intermediate result, termed interesting orders (see, e.g., Selinger, P. G., et. al. above; Simmen, D., et. al., "Fundamental techniques for order optimization", ACM SIGMOD International Conference on Management of Data, pp. 57–67, Montreal, Quebec, June 1996, Association of Computing Machinery), which can lead to the discovery of less expensive strategies by avoiding (usually expensive) sorts on intermediate results.

All told, a major challenge in database systems designed to run on small computing devices is to significantly reduce the amount of memory required for join enumeration. The present invention provides a solution to this challenge.

SUMMARY OF THE INVENTION

The present invention provides a deterministic join enumeration methodology for left-deep processing trees, currently implemented in Sybase SQL Anywhere, a small-footprint relational database system whose target market ranges from workgroup servers to small hand-held devices. By providing a deterministic branch-and-bound join enumeration method for left-deep processing trees, the invention is able to efficiently optimize complex queries with high join degree by employing a novel approach to cost-based pruning of the search space.

Plan generation involves the generation of alternative "join strategies" for each subquery block. A "subquery" may be thought of as a "query within a query" (i.e., a nested query). Unlike IBM's Starburst optimizer, which separates join enumeration from plan generation and cost estimation (see, e.g., Ono, K. and Lohman, G. M. above), the ASA optimizer combines these processes into a single unified methodology. Cost estimation is an integral part of the enumeration method, because it is through comparing the costs of partial access plans that the ASA optimizer can quickly prune significant portions of the join strategy search space.

The plan generation phase optimizes each subquery in the QOG independently, starting with the leaves. For each subquery, plan generation involves the following four distinct steps:

1. adjust predicate selectivities to account for disjuncts, Between predicates, and user estimates of selectivities;
2. construct a join graph for the query that models inner and outer equijoin predicates, sargable single-variable predicates on single quantifiers, and Cartesian products;
3. enumerate join strategies and prune the search space using a branch-and-bound heuristic;
4. recall the cheapest strategy and construct the detailed access plan for that strategy.

Empirical performance results on several production queries obtained from SQL Anywhere customers show that this approach requires significantly less memory than other deterministic join enumeration approaches, which have been described in the literature.

DETAILED DESCRIPTION OF A PREFERRED EMBODIMENT

The following description will focus on the presently-preferred embodiment of the present invention, which operates in an environment executing database applications, typically on portable devices requiring SQL database support. The present invention, however, is not limited to any particular application or environment, or query language (e.g., SQL) syntax. Instead, those skilled in the art will find that the present invention may be advantageously applied to any application or environment where embedding a database system is desirable. The description of the exemplary embodiments which follows is, therefore, for the purpose of illustration and not limitation.

General Architecture

A. System Hardware

Figure 1:
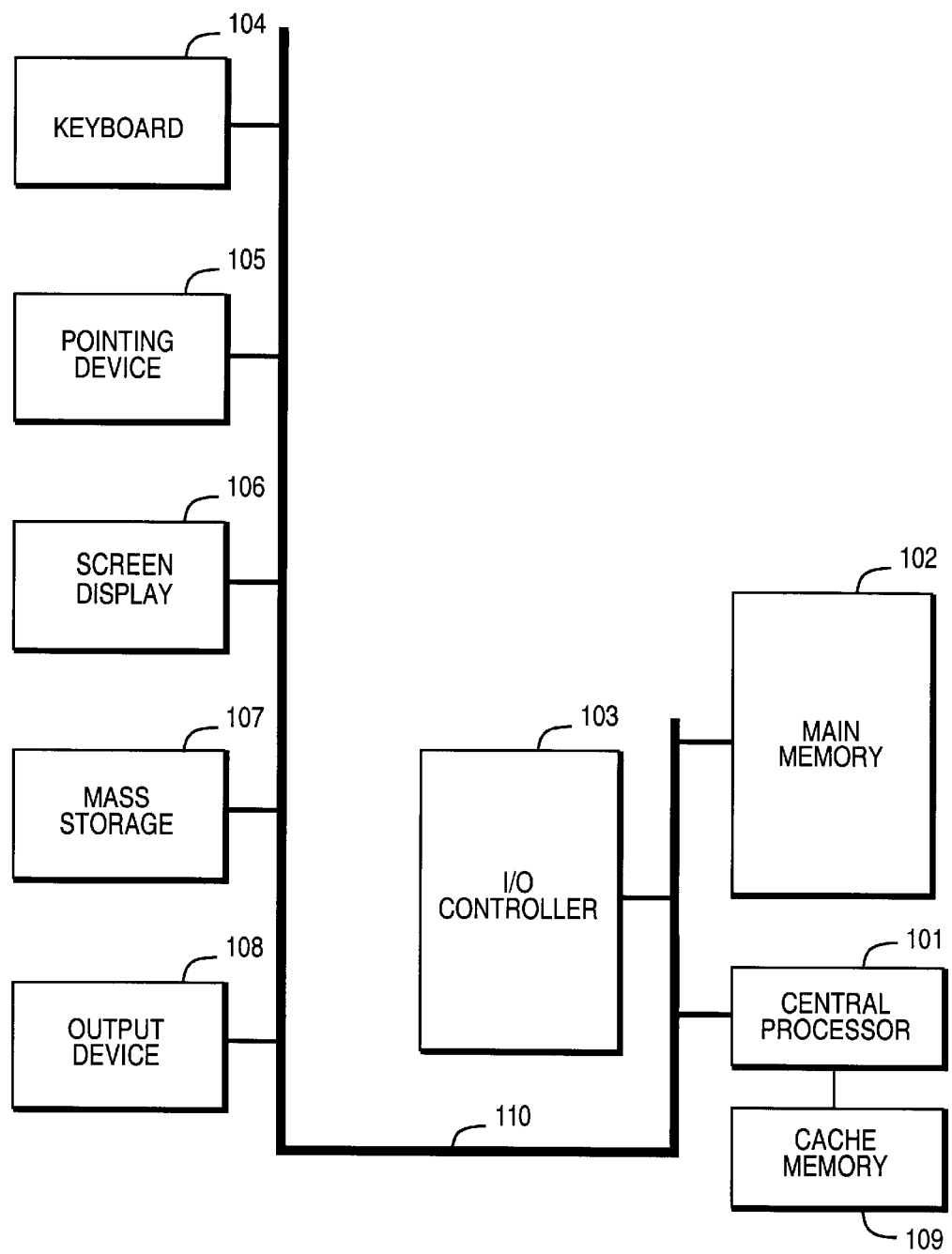
FIG. 1 is a block diagram of a computer system suitable for embodying the present invention.

The present invention may be embodied on a computer system such as the system 100 of FIG. 1, which includes a central processing unit (CPU) 101, a main memory 102, an input/output controller 103, a keyboard 104, a pointing device 105 (e.g., mouse, track ball, pen device, or the like), a display device 106, a mass storage 107 (e.g., removable disk, floppy disk, fixed disk, optical disk (including CD-ROM), and the like), and a cache memory 109. Additional input/output devices, such as a printing device 108, may be provided with the system 100 as desired. As shown, the various components of the system 100 communicate through a system bus 110 or similar architecture. In a preferred embodiment, the system 100 includes an IBM-compatible personal computer, available from a variety of vendors (including IBM of Armonk, N.Y.).

Database applications, for use in the system, will typically be deployed on portable computing devices, thereby enabling mobile computing application deployment. Thus, system 100 will, in a preferred embodiment, comprise a portable computer, such as a laptop or palmtop, for accommodating mobile users. Apart from PC-compatible portable computing or microprocessor-equipped devices, other examples of such devices include PalmPilot™ available from 3Com of Santa Clara, Calif., HP Palmtop PCs available from Hewlett-Packard of Palo Alto, Calif., and StarTac™ cell phones available from Motorola of Schaumburg, Ill.

B. System Software

1. General

Figure 2:
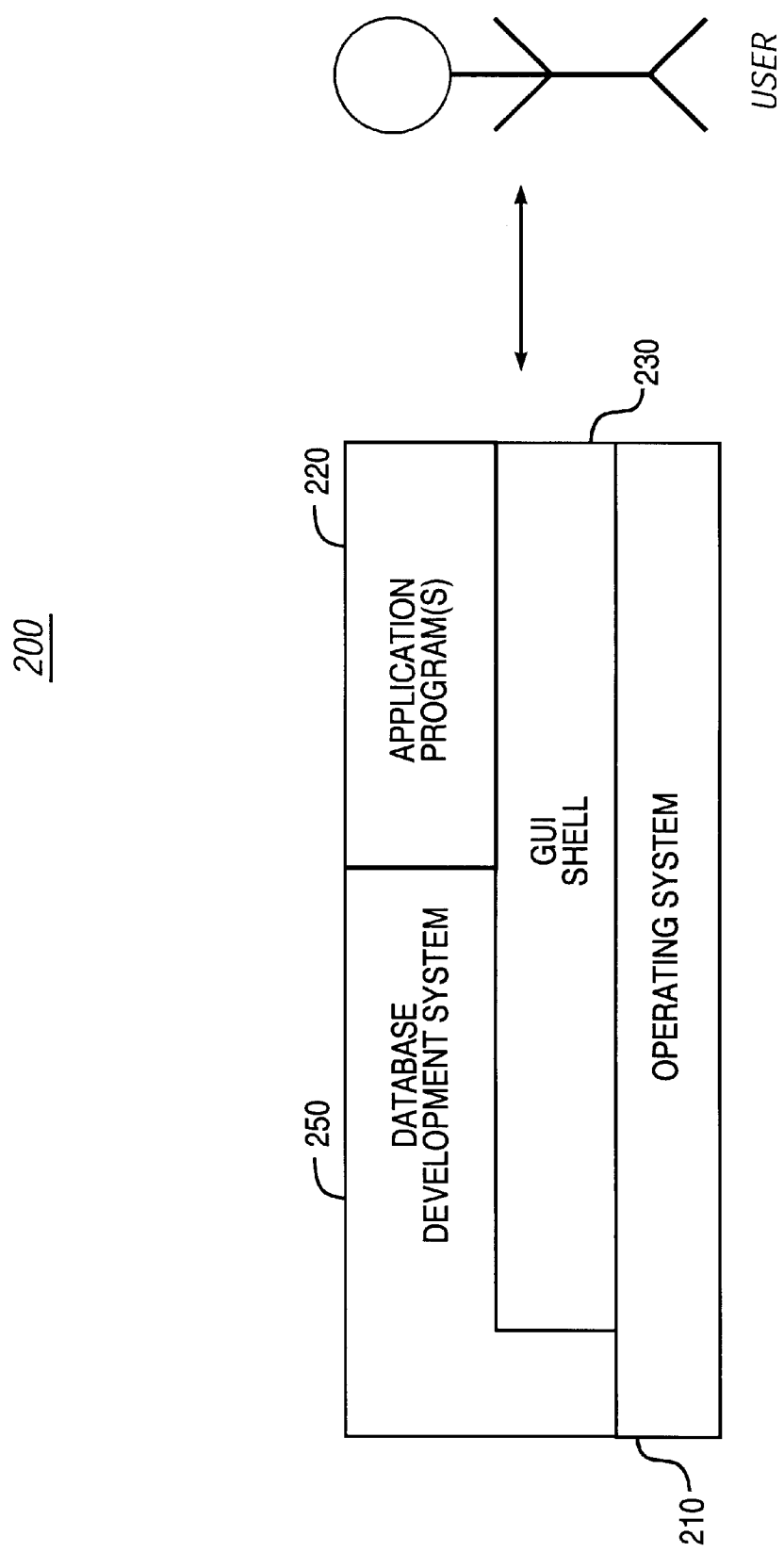
FIG. 2 is a block diagram of a computer software system provided for directing the operation of the computer system of FIG. 1.

Illustrated in FIG. 2, a computer software system 200 is provided for directing the operation of the computer system 100. Software system 200, which is stored in system memory 102 and/or on disk storage 107, includes a kernel or operating system (OS) 210 and a graphical user interface (GUI) shell or interface 230. One or more application programs, such as application programs 220, may be "loaded" (i.e., transferred from storage 107 into memory 102) for execution by the system 100. OS 210 and shell 230, as well as application software 220, include an interface for receiving user commands and data and displaying results and other useful information. Software system 200 also includes a database development system 250 of the present invention for developing and deploying database application programs. As shown, the development system 250 includes components which interface with the system 100 through shell 230 as well as components which interface directly through OS 210.

In a preferred embodiment, operating system 210 and windows shell 230 are provided by Microsoft® Windows 2000, available from Microsoft Corporation of Redmond, Wash. Those skilled in the art will appreciate that the system may be implemented in other platforms, including Macintosh, UNIX, and the like. Database development system 250, on the other hand, includes a database development environment of the present invention comprising Sybase® SQL Anywhere Studio (Sybase, Inc. of Emeryville, Calif.). Application software 220 can be any one of a variety of software applications, such as word processing, database, spreadsheet, text editors, and the like, including those created by the development system 250.

2. Commercial Embodiment

Adaptive Server Anywhere (ASA) is the relational database system that forms the core module of Sybase SQL Anywhere Studio, a suite of technologies intended for use in workgroup, mobile, and embedded computing applications. SQL Anywhere Studio offers database design and management tools, reporting and forms-based tools, tools for providing HTML content directly from a relational database, and database replication technologies for mobile users. Adaptive Server Anywhere (ASA) is a full-function relational database that provides the typical array of database services: support for ANSI standard SQL, transaction and connection management, stored procedures and triggers (in either PSM table and column constraints), views, online backup, row-level locking, JDBC, ODBC, and embedded SQL programming language interfaces, BLOB support, and so on.

In addition to these typical DBMS capabilities, Adaptive Server Anywhere contains several technological innovations specifically targeted towards its intended market.

In particular, SQL Anywhere Studio contains two specific technologies that enable the development of database applications that are particularly suited for mobile and embedded applications. The first, named SQL Remote, enables two-way replication of database updates between a "consolidated" database and client ASA databases. This technology specifically targets distributed database application environments where the remote users are disconnected from the network, possibly for long periods; one example is sales force automation applications. The second technology is referred to as the Ultralite Deployment Option. This technology enables the deployment of a database application on very small computing platforms, developed using standard embedded SQL. The application source, together with the schema objects it references, are linked together with a run-time library of the database functionality that the application requires, which in effect is a main-memory DBMS. The complete application can then be executed on a wide variety of small-footprint devices, from cell phones to pagers.

For ease of administration, ASA stores the databases themselves as simple OS files. The files are completely portable from one operating environment to another, even between big-endian and little-endian architectures. ASA contains its own virtual storage manager to support operating environments like Novell NetWare which does not support virtual storage themselves. ASA's cache manager allocates virtual storage as necessary from a temporary disk file, and pages these blocks as required using page frames from the database's buffer pool. Each database request requires its own "heap" of virtual storage to reduce fragmentation. Hence, other than the RAM required for the buffer pool, ASA does not require any additional system memory other than that required for the program stack.

ASA also supports user-defined data types implemented as JAVA classes. Ease of use is a design goal of SQL Anywhere, as one of its main uses is in embedded systems and sales force automation applications where the database administration function is done remotely, if at all. For example, database statistics used by the query optimizer are gathered and maintained during query processing-there is no separate statistics-gathering utility. These statistics, such as predicate selectivities, are then used by the optimizer when optimizing subsequent queries. ASA is available for a variety of different operating environments, including Windows NT, Windows 95/98, Windows 3.x, Windows CE, Novell NetWare, Sun Solaris/SPARC, Hewlett-Packard HP-UX, IBM AIX, and Linux. Further description is available in the documentation accompanying the product, which is available from Sybase, Inc. of Emeryville, Calif.

The following description will focus on those aspects of the development system that are helpful for understanding the methodology of the present invention for supporting join enumeration in a memory-constrained environment, thus improving the process of accessing and processing databases from memory constrained (e.g., portable) devices.

Join Enumeration in a Memory-Constrained Environment

A. Introduction: Join Enumeration in ASA

Figure 3:
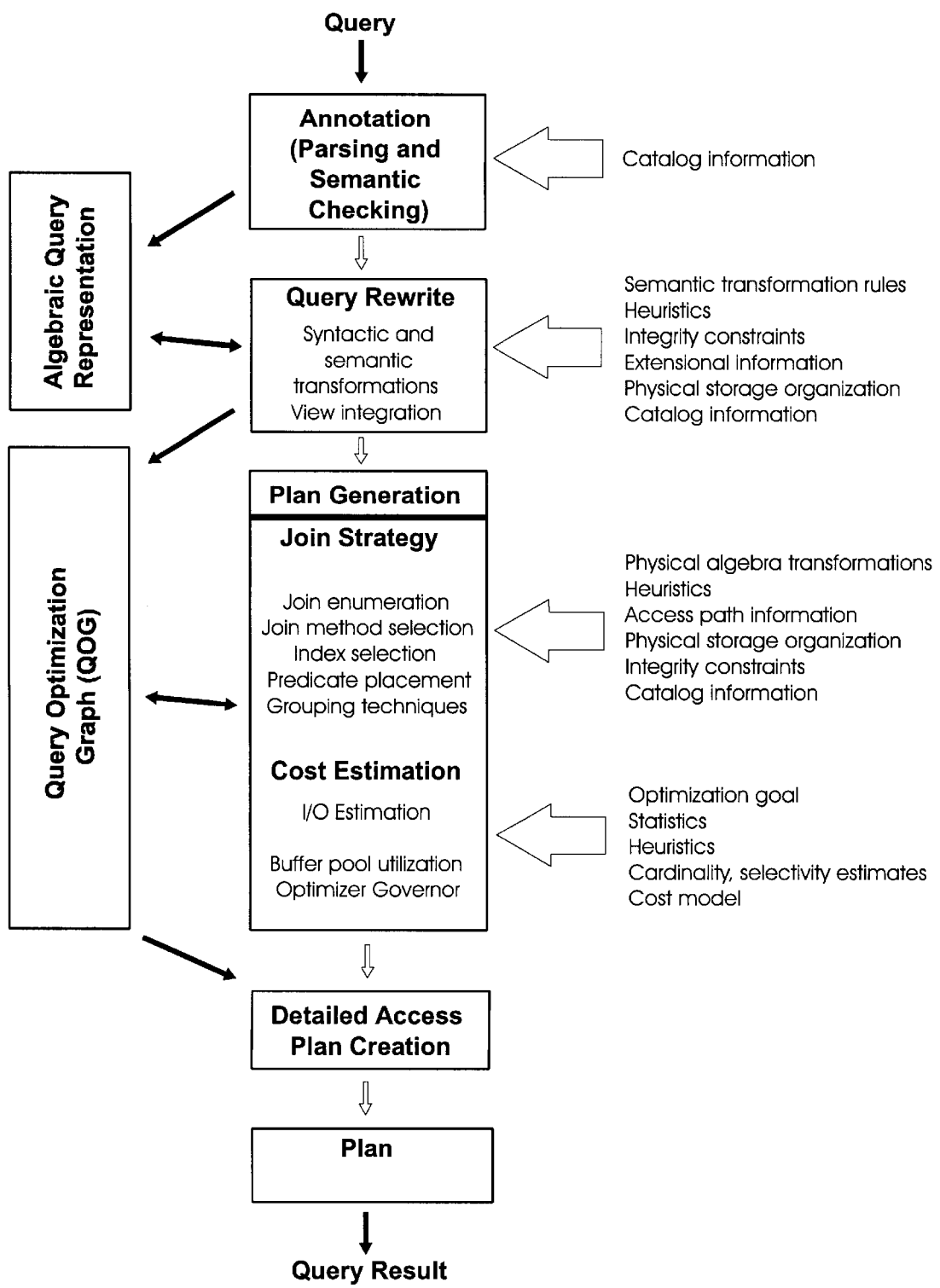
FIG. 3 illustrates the overall process of query optimization in a relational database system employed by the present invention.

FIG. 3 illustrates the overall process of query optimization in ASA. The input to the plan generation phase of Adaptive Server Anywhere's query optimizer is a Query Optimization Graph (QOG), pronounced "cog." A QOG is the internal representation of a complete SQL statement, possibly composed of multiple "subquery blocks." The following discussion focuses exclusively on selection queries, though QOGs are also constructed for Update, Delete, and Insert statements.

The database entities referred to by each subquery block, including tables, columns, predicates, and so on, are also included in the QOG. The set of subquery blocks within a QOG form a tree, with the outermost Select block at the root. Each subquery block, which, for example, can represent an input to a Union operation, or a true subquery contained within an Exists predicate, is optimized independently in a bottom-up fashion. Complex queries, such as those involving views containing Group by or Union, are modeled in a QOG through the use of multiple subquery blocks.

Plan generation involves the generation of alternative "join strategies" for each subquery block. Unlike IBM's Starburst optimizer, which separates join enumeration from plan generation and cost estimation (see, e.g., Ono, K. and Lohman, G. M. above), the ASA optimizer combines these processes into a single unified methodology. Cost estimation is an integral part of the enumeration method, because it is through comparing the costs of partial access plans that the ASA optimizer can quickly prune significant portions of the join strategy search space. The following discussion focuses on the join enumeration process, and give specifics regarding cost estimation only where necessary.

As mentioned above, the plan generation phase optimizes each subquery in the QOG independently, starting with the leaves. For each subquery, plan generation involves the following four distinct steps:

1. adjust predicate selectivities to account for disjuncts, Between predicates, and user estimates of selectivities;
2. construct a join graph for the query that models inner and outer equijoin predicates, sargable single-variable predicates on single quantifiers, and Cartesian products;
3. enumerate join strategies and prune the search space using a branch-and-bound heuristic;
4. recall the cheapest strategy and construct the detailed access plan for that strategy.

The join graph implementation in ASA which is used to drive the enumeration process will now be described.

B. Join Graph Representation

The join graph constructed for each subquery in the QOG is a graph:

$G=<V,E>$

The vertices in V[G] are of two types: simple vertices $V^T$, each of which represents a quantifier over a base or derived table, and outer join vertices $V^J$ which represent a left-outer join (all right-outer joins are rewritten as left-outer joins by swapping their operands). The edges in E[G] are of four types. The first set of directed edges, termed an outer join edge and denoted $E^J$, relate each null-supplying table of a left-outer join to its (immediate) left-outer join vertex $v \in V^J$. Nested outer joins are modeled by additional edges in $E^J$ from each nested null-supplying outer join vertex to its "parent" outer join vertex. Other join graph constructs, including information regarding the preserved side of an outer join, are used during optimization but are unnecessary for join enumeration and are therefore omitted from discussion. In addition, each outer join vertex contains a set N of all its null-supplying tables, including those from nested outer joins.

Related to the edges in $E^J$ is a second set of directed edges, termed dependency edges, denoted $E^D$. Each directed edge $(v_1, v_2) \in E^D$ links a vertex $v_1$ representing a table on the null-supplying side to a vertex $v_2$ on the pre-served side of a left-outer join. In the case of nested outer joins, there exist dependency edges from the null-supplying tables to all of the tables on preserved side. For a valid SQL query the subgraph $G=<V,D>$ must be acyclic. There are two sets of edges to represent sargable restriction conditions. One type of edge, termed a single-variable edge whose set is denoted $E^S$, is an directed edge from a vertex to itself, labeled with those sargable, single-variable predicates that exist in the subquery's restriction predicate. These predicates either existed in the original query syntax, or were inferred from other predicates during rewrite optimization. The second set of edges, denoted $E^E$, consists of undirected equijoin edges which connect two vertices related by at least one conjunctive equijoin condition (again, either present in the original query or inferred during rewrite optimization). Each equijoin edge is labeled with the set of conjunctive equijoin conditions that form the join predicate.

EXAMPLE 1

Figure 4:
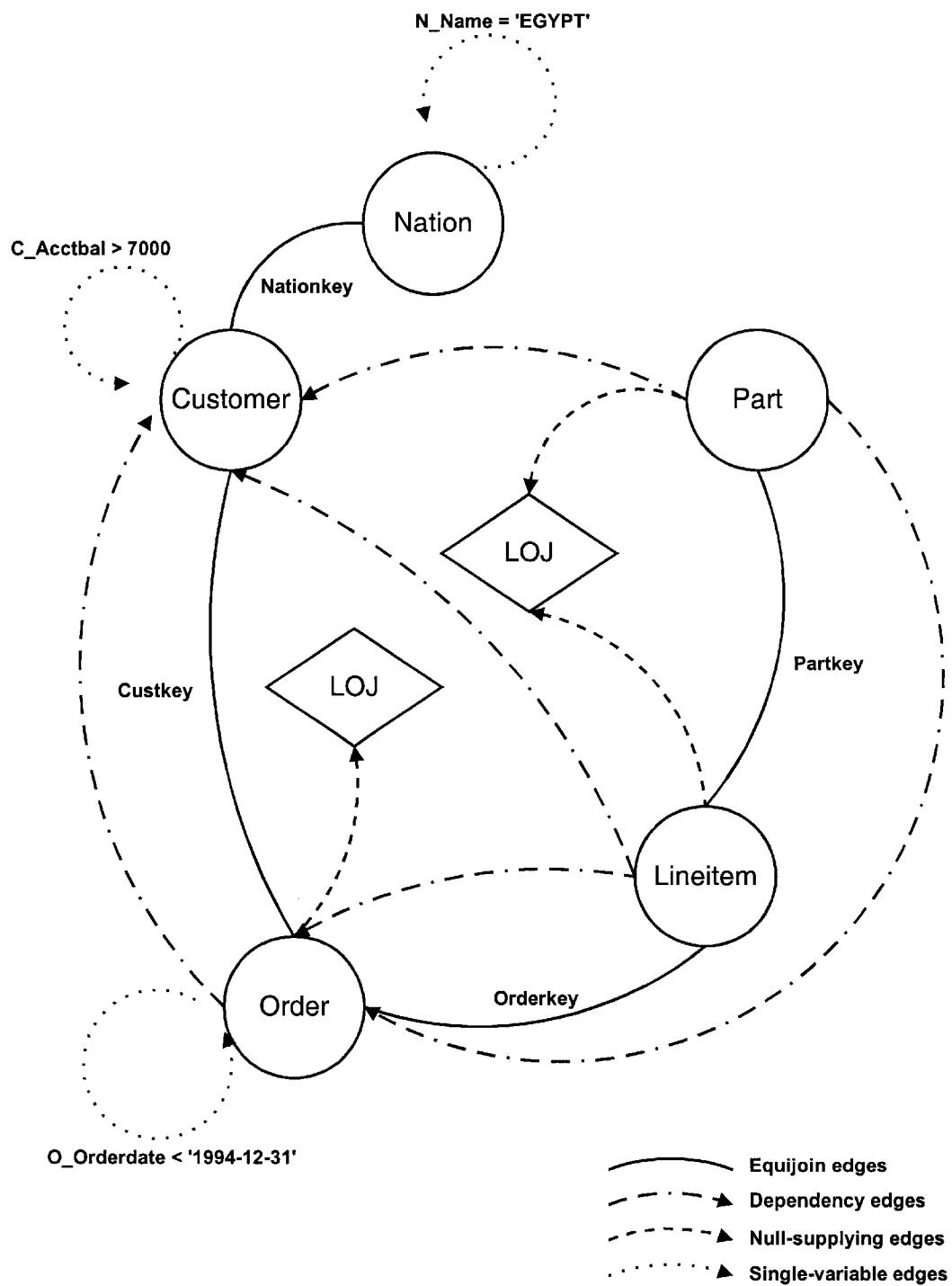
FIG. 4 illustrates a resulting "join graph" for a given query.

Consider the following nested outer join query over the TPCD schema:

Select C-Custkey, C-Name, C-Mktsegment, O-Orderkey,
    P-Partkey, P-Name, P-Brand, P-Type
From Nation,
    (Customer left outer join Order
        on ( C-Custkey = O-Custkey and
            O-Orderdate < '1994-12-31' ) )
    left outer join
    ( Lineitem inner join Part
        on (L-Partkey = P-Partkey) )
    on (O-Orderkey = L-Orderkey
       and P-Type like '%TIN%')
    Where C-Nationkey = N-Nationkey and
      C-Acctbal > 7000 and N-Name = 'EGYPT' which returns customer, order, and part information for those Egyptian customers with relatively large account balances, returning detailed information on tin orders made before the end of 1994. The resulting join graph for this query is shown in FIG. 4. Solid, dotted, dashed, and combination edges represent those edges in sets $E^E$, $E^S$, $E^J$, and $E^D$ respectively.

C. Join Enumeration Overview

1. Defintion 1: JOIN STRATEGY

As described earlier, ASA uses left-deep processing trees exclusively; hence any join strategy S [1, m] is a linear ordering of the m quantifiers $V^T$ in the join graph.

2. Definition 2: JOIN STRATEGY PREFIX

A prefix of a join strategy of length k is simply the ordered subset of the first k tables in the join strategy S, that is S [1, k]. If k is 0, then this denotes an empty prefix. In the case of inner joins or Cartesian products, any per-mutation of the tables results in a valid strategy. However, in the case of outer joins, the set of valid join strategies is restricted to those where each outer joins preserved tables must precede its null-supplying tables; this restriction is due to the manner in which the server's query processing component computes an outer join's result.

"Join enumeration" is a recursive process which iteratively adds another table to the prefix of a join strategy, whose length is denoted $L_P$, until the strategy is completely determined, at which point the strategy's cost is estimated. There may be several alternative tables that could be placed at any "position" $L_P+1$ in the join strategy-a necessary condition is that the valid alternatives are those that satisfy a topological sort of the vertices $V^T$ with respect to edges in $E^D$ and the current prefix, denoted $(V^T, D, L_P)$. This condition satisfies the requirement that, for each left-outer join, all preserved tables precede the null-supplying tables in the strategy; however, it is not a sufficient condition. This is because the optimizer may unnest one or more outer joins, when valid to do so, to create a larger space of valid join strategies (see, e.g., Galindo-Legaria, C. and Rosenthal, A., "Outerjoin simplification and reordering for query optimization", ACM Transactions on Database Systems, 22(1): 43–74, March 1997). Consequently there may be two or more outer joins at the same "level" of nesting, but the method include steps to ensure that the null-supplying sides of each remain contiguous in any strategy. Once the valid alternatives are selected, the enumeration method considers them in rank order. Each table is as signed a "rank" as to the suitability of that table at position $L_P+1$ in the current strategy with prefix S [1, $L_P$]. Ranking is performed by analyzing the edges $E^E$ and $E^S$ in G. For example, a table $R_1$ is ranked more highly than table $R_2$ if an equijoin edge (v, $R_1$) $\in E^E$ exists for some vertex $v \in$ S [1, $L_P$].

Several other factors affect a vertex's rank including the table's cardinality and its "outdegree" of equijoin edges to other tables that are not yet placed in the strategy. By considering tables in rank order, the enumeration method will initially (and automatically) defer Cartesian products to as late in the strategy as possible, though it is still possible that the optimizer will later consider other join strategies that contain a Cartesian product at an earlier point in the access plan. Hence it is likely that the first join strategy generated, though not necessarily optimal, will be one with a "reasonable" overall cost, relative to the entire search space. The entire method is branch-and-bound in the sense that a subsequent set of strategies is retained only if each one's cost is not probably greater than the cost of the best join strategy discovered this far.

D. Method 1: ASA's Plan Generation Process

The novel part of the enumeration method is the approach in which the search space is pruned during join strategy generation.

1. Cost Estimate: ESTIMATE-COST function

In addition to producing the estimated overall cost of an access plan, the ESTIMATE-COST function also returns the point in the strategy in which the cost of producing an intermediate result exceeds that of the lowest plan cost computed thus far; this is the essence of the method's branch-and-bound paradigm. A significant component of any plan's cost concerns its buffer pool utilization. See, e.g., Haas, L. M., et. al., "Seeking the truth about ad-hoc join costs", The VLDB Journal, 6(3): 241–256, August 1997; Mackert, L. F. and Lohman, G. M., "Index scans using a finite LRU buffer: A validated I/O model", ACM Transactions on Database Systems, 14(3): 401–424, September 1989; Ozsu, M. T. and Meechan, D. J., "Join processing heuristics in relational database systems", Informatin Systems, 15(4): 429–444, 1990; Sacco, G. M. and Schkolnick, M., "A mechanism for managing the buffer pool in a relational database system using the hot set model", Proceedings of the 8th International Conference on Very Large Data Bases, pp. 257–262, Mexico City, Mexico, September 1982, VLDB Endowment; Swami, A. and Schiefer, K. B., "Estimating page fetches for index scans with finite LRU buffers", ACM SIGMOD International Conference on Management of Data, pp. 173–184, Minneapolis, Minn., May 1994; Swami, A. and Schiefer, K. B., "Estimating page fetches for index scans with finite LRU buffers", The VLDB Journal, 4(4): 675–701, October 1995. Moreover, measures such as buffer hit ratios can be accurately estimated only with regard to the entire strategy, since the least-recently used pages will be from those tables at the root of the processing tree. Nonetheless, ESTIMATE-COST estimates the cost of computing an intermediate result based on a very optimistic metric: namely, that half the buffer pool is available for each quantifier in the plan. Clearly this is nonsensical with any join degree greater than 1, but the point of this computation is not to accurately cost the plan, but simply to quickly prune from the strategy space those grossly inefficient strategies.

2. Optimizer Governor

The optimizer governor is part of cost estimation and has two main goals. The first goal is to ensure that the chosen join strategy for any query is one which contains the fewest Cartesian products. The second goal is to prevent situations where cost-based pruning is in sufficient to reduce the search space significantly, which can lead to lengthy optimization times. A set of heuristics attempts to tradeoff an increase in optimization time versus improved execution performance. The goal of these heuristics is to increment the cost of a strategy by some factor Δ with each iteration. The value of Δ increases as more alternative strategies are considered, and it is further increased in the case where several successive strategies fail to differ significantly in terms of cost. This helps, for example, to prevent the naive evaluation of successive strategies for a star-join query where each alternative strategy's cost is almost identical.

E. Detailed Methodology

Procedure PLAN-GENERATION (Method 1) is the mainline of join enumeration. It is summarized below.

---

Procedure: PLAN GENERATION
Purpose: Generate an optimal access plan for query $Q_i$.
Inputs: A QOG Q with join graph G for query $Q_i$.
Output: Q modified for the optimal left-deep strategy S.
begin
   $C_B \leftarrow \infty$;
   $L_P \leftarrow 0$;
   for each $v \in V^T$ do Order[v] $\leftarrow \infty$ od;
   call ENUMERATE (Q, G, $L_P$);
   -- Recall the cheapest join strategy.
   Reassign vertex order $\forall v \in V^T$ [G] as per S;
   -- Create the detailed access plan.
   Re-perform predicate placement with respect to S;
   Perform index selection $\forall v \in V^T$ [G];
   Alter predicate placement based on index selection;
   Alter predicate placement based on selectivity;

-continued

```
    return Q
end
```

It sets the lowest cost ($C_B$) to ∞ (line 6) and the length of the join strategy S to 0 (line 7). On return from ENUMERATE, when an optimal join strategy has been determined, PLAN-GENERATION modifies G to order the vertices in $V^T$ as per their position in S (line 11). Index selection follows, and predicates are placed in the strategy as early as possible. Predicates are divided into four distinct groups: sargable matching predicates, equality conditions, inequality conditions, and expensive predicates, sorted by selectivity (lines 13 to 16). The ENUMERATE function first determines those vertices in $V^T$ that can appear at position $L_P+1$ in the strategy via a call to procedure FIND-CANDIDATES (Method 2).

FIND-CANDIDATES itself may be implemented as follows.

```
Procedure: FIND-CANDIDATES
Purpose: Determine candidates V^C for position L_P + 1.
Inputs: Join graph G, prefix length L_P.
Output: set of candidate vertices V^C.
begin
    V^C ← 0;
    for each v_i ∈ V^T do
        if Order [v_i] ≤ L_P then continue fi;
        -- Ensure vi satisfies (V^T, D, L_P).
        v_i^D ← {v ∈ V^T | (v_i, v) ∈ D};
        if ∃ v ∈ v_i^D | Order[v] > L_P then continue fi
        if L_P = 0 then
            V^C ← V^C ∪ v_i
        else
            -- Ensure contiguous null-supplying sides in S.
            v_j ← v ∈ V^T | Order[v] = L_P;
            j ← v ∈ V^J | (v_j, v) ∈ E^J;
            Loop: while j ≠ Null do
                if v_i ∈ N [j] then
                    V^C ← V^C ∪ v_i;
                else
                    for each v ∈ V^T | (v, j) ∈ E^J do
                        if Order[v] > L_P then
                            -- This outer join is incomplete, so v_i ∉ V^C.
                            break Loop
                        fi
                    od ;
                    j ← v ∈ V^J | (j, v) ∈ E^J;
                    continue
                fi
            fi ;
            break
        od ;
        if j = Null then
            V^C ← V^C ∪ v_i
        fi
    fi
    od
    return V^C
end
```

The main loop in FIND-CANDIDATES (lines 25 through 56) is over each vertex in $V_i \in V^T$ that is yet to be placed in the strategy (line 26). If $v_i$ satisfies the topological sort ($V^T$, D, $L_P$) (line 29) then $v_i$ can be added to the set of candidates $V^C$ under the following conditions:
1. the prefix is empty-hence $v_i$ cannot be a null-supplying table (line 31);
2. $v_i$, like the last table in the prefix ($v_j$), is also a null-supplying table for the same outer join (line 38);
3. $V_j$ is not a null-supplying table of any outer join (line 53).

Lines 36 through 51 iterate through each nested outer join to which vertex $v_j$ belongs, ensuring that the null-supplying tables of each outer join remain contiguous in the strategy.

ENUMERATE (Method 3) is a recursive procedure that iteratively adds a vertex to the current join strategy prefix until only a single table remains, at which point the method performs index selection and predicate placement (lines 70 through 73) and subsequently estimates the cost of the strategy (line 74). If that cost is lower than the best achieved thus far, the cost and strategy are saved for later recall (line 76). Otherwise, the method considers each candidate vertex in rank order. Method 3 may itself be implemented as follows.

```
Procedure: ENUMERATE
Purpose: Enumerate join strategies for a join graph G.
Inputs: A QOG Q with join graph G, prefix length L_P.
Output: Optimal join strategy S; prefix length L_J.
begin
    M ← || V^T || - L_P;
    -- Determine the candidates V^C for this strategy position.
    V^C ← FIND-CANDIDATES(G, L_P);
    if M = 1 then
        -- V^C consists of a single vertex v.
        Order[v ∈ V^C] ← L_P + 1;
        Perform predicate placement based on S;
        Perform index selection for each vertex v ∈ V^T;
        Alter predicate placement based on index selection;
        Alter predicate placement based on selectivity;
        C, L_J ← ESTIMATE-COST(Q);
        if C < C_B then
            C_B ← C;
            S ← V^T, sorted by join strategy order
        fi
    else
        if || V^C || > 1 then
            Sort the vertices in V^C by ascending cardinality;
            Sort the candidate vertices in V^C on the basis of rank
        fi
        L_J ← ∞;
        i ← 0;
        for each v_i ∈ V^C in sorted order do
            -- Reset the order of all other vertices.
            for each v ∈ V^T not in the current prefix do
                Order[v] ← ∞
            od;
            -- Tentatively select the candidate vertex v_i ∈ V^C.
            Order[v_i] ← L_P + 1;
            L_C ← ENUMERATE (Q, G, L_P + 1);
            if L_C < L_J then
                L_J ← L_C
            fi;
            if L_C < L_P + 1 then brrak fi
        od
    fi;
    return L_J
end
```

A prior sort of the vertices (line 81) ensures syntax-independence. The prefix length $L_J$ retains the shortest prefix length for which the cost C of any alternative strategy exceeded $C_B$ (line 95). It is possible that $L_J<L_P$ due to the cost increment Δ added by the optimizer governor. If $L_J \leq L_P$ there is no need to consider any join strategy whose prefix S [1, $L_J$] is identical. Pruning of the search takes place on line 97, where if a recursive call to ENUMERATE returns a position less than $L^P$ this entire prefix is bypassed and returned to consider a prefix with length $L_P-1$.

E. Empirical Results

1. General

All data structures allocated during join enumeration have a lifetime bounded by the associated function invocation. The implementation of ASA takes advantage of this lifetime to place all dynamically allocated data structures on the program execution stack (using the alloca ( ) function) instead of on the heap. Stack-based allocation is faster than heap-based allocation, and this approach also avoids fragmenting the heap with the variable-sized candidate sets used during enumeration.

The stack-based allocation does, however, limit the maximum join degree that can be optimized with the ASA enumeration method; with the NT configuration of ASA, this limit is over 500 quantifiers. Although one can analytically determine the storage requirements for the $V^C$ sets, the implementation of join enumeration in ASA also uses small amounts of memory for local variables and function return addresses; this overhead grows linearly with the number of vertices considered. In addition, index selection requires memory that varies depending on the schema definition (in particular, available indexes), and the predicates in the query. The memory over-head for index selection is only incurred once per strategy, and so adds a constant memory overhead.

In order to determine the total memory requirements of the ASA join enumeration method, the method has been instrumented to monitor the peak stack usage during enumeration and performed several empirical tests. Although a broad, systematic study has not been performed, the results provided give an indication of the typical memory requirements for the ASA join enumeration method in practice. The tests were performed using a calibrated debugging version of a Sybase SQL Anywhere 7.0 Beta server executing under Windows NT 4.0. Because the server is a debugging version, the memory requirements reported below will exceed those for a production-mode server.

2. TPCD Results

The 7.0 Beta server was tested using a scale factor 1 instance of the TPCD schema with a 200 MB buffer pool on IBM hardware utilizing an Intel Pentium processor. Testing was restricted to those TPCD queries with the greatest join[5] (5: All join examples in paper provide only inner and outer equijoins) degree, with the number of quantifiers ranging from 4 to 8. The results are shown in Table 1.

TABLE 1

Stack usage for join enumeration of TPCD queries.

| TPCD | Quantifiers | Strategies considered | Stack usage (k)2a |
|---|---|---|---|
| 5 | 66 | .7 | 2b[a] |
| 4 | 20 | .6 | 5 |
| 6 | 203 | .9 | 7 |
| 6 | 690 | 1.0 | 8 |
| 8 | 751 | 1.1 | 9 |
| 6 | 168 | .9 | |

3. User Examples

Sybase customers have taken advantage of the ASA optimizer, which allows them to pose very complex queries. In some cases, users are aided by automated query writing tools in creating these complex queries. In other cases, the queries are built up out of several views. Typically no individual view is overly complicated; however, in combination, they can present queries with very high join degrees. The five most interesting customer queries that have been reported to the lab have been considered. The access plans for each were constructed with a calibrated server utilizing a default buffer pool size of two (2) Mb.

EXAMPLE 2

This example is deceptively simple: the query itself is a straightforward Select * from V, where v is a view. However, the definition of this view is 557 lines long, containing two Union All operators and 10 query specifications appearing in either Select or Where clauses. Each of the three Unioned queries has a "snowflake" topology with identical From clauses. Each From clause contains 21 left outer joins and 8 inner joins over 30 quantifiers. In Table 2, only the results for the Unioned query specifications are shown; the subqueries are all trivial. The memory usage for these three Unioned queries is similar, but not identical; the difference is caused by the presence of predicates which cause different indexes to be considered.

EXAMPLE 3

Example 3 has a "star" topology, and contains six outer joins and nine inner joins over 16 quantifiers. However, one of these tables is a view containing one outer join and four inner joins over six tables. In addition, the view contains a subquery which is rewritten as a join. After view rewriting and subquery flattening, the optimizer considered join strategies for a rewritten query specification with seven outer joins, 14 inner joins, and 22 base tables.

EXAMPLE 4

Example 4 is a "tree" query containing six outer joins and 15 inner joins over 22 tables. Unlike the other example queries, this query was generated by a commercial report generating tool.

EXAMPLE 5

Example 5 is a "star" query containing 18 inner joins over 19 base tables.

EXAMPLE 6

Example 6 is a "star" query; two base tables are joined with an inner join, and 12 other base tables are connected to these two with 12 outer joins.

4. Analysis

While dynamic programming approaches to join enumeration typically require storage that increases exponentially with the join degree, the method described above uses space that grows only as the square of the number of quantifiers. The largest dynamically allocated data structure used during enumeration is the set $V^C$ of candidate vertices used in the ENUMERATE method. This set is represented as an array of pointers, and for each recursive invocation of ENUMERATE, $\|V^C\| \leq M$. With a maximum recursion depth of $\|V^T\|$, this gives a peak storage requirement for these sets of P n(n+1)/2, where P is the size of each pointer in the set (4 bytes with the NT configuration of ASA) and is the number of quantifiers in the plan.

TABLE 2

Stack usage for the examples in Section 3.2.

| Example Query | Quantifiers | Strategies considered | Stack usage (k)2a |
|---|---|---|---|
| 30 | 244 | 5.4 | |
| 2b | 30 | 218 | 5.7 |
| 2c | 30 | 268 | 6.6 |
| 3 | 22 | 864 | 3.7 |
| 4 | 22 | 829 | 3.9 |
| 5 | 19 | 1884 | 3.7 |
| 6 | 14 | 1185 | 2.3 |

As with many branch-and-bound methods, ASA's join enumeration method is factorial in the worst case, though the optimizer governor effectively places an upper bound on its execution by arbitrarily halting the optimization process once "enough" strategies have been considered[6] (6: All join examples in this paper involve only inner and outer equijoins). As shown by these examples, however, the method's behavior in practice is considerably better. Resource constraints prevent us from presenting an average-case complexity analysis, which is made more difficult for two reasons. Firstly, a strategy's cost C is different from the cost used to compute $L_p$, upon which the method's pruning criteria is based. Secondly, both costs are based on physical access paths, and not a simplified model based on the sizes of intermediate results.

In conclusion, there are two observations. First, authors such as Mackert and Lohman, Swami and Schiefer, and Haas et al. have argued that only accurate estimation can lead to the discovery of a (near) optimal strategy, though in contradiction Kumar and Stonebraker have argued that inaccuracies make little difference in the discovery of optimal or near-optimal strategies. Certainly the optimistic approach to cost-based pruning in ASA falls into this latter camp, though it is strongly concurred that better estimates, in the main, lead to better plans. Second, the anecdotal examples provide additional evidence to what is believed to widely occur in practice, namely: (1) that the vast majority of queries involve foreign key-primary key inner or outer joins, and (2) that schemas tend towards "star" or "snowflake" topologies-so that it is exceedingly rare to encounter a "chain" query with a join degree of, say, greater than six. Clearly, adequate, if not superlative, optimization of cyclic, "star", or "snowflake" queries is required even for "small footprint" database servers. None of the queries discussed herein were subject to this limit.

F. Summary of Enumerate and Find-Candidate Methodologies

Figure 5A:
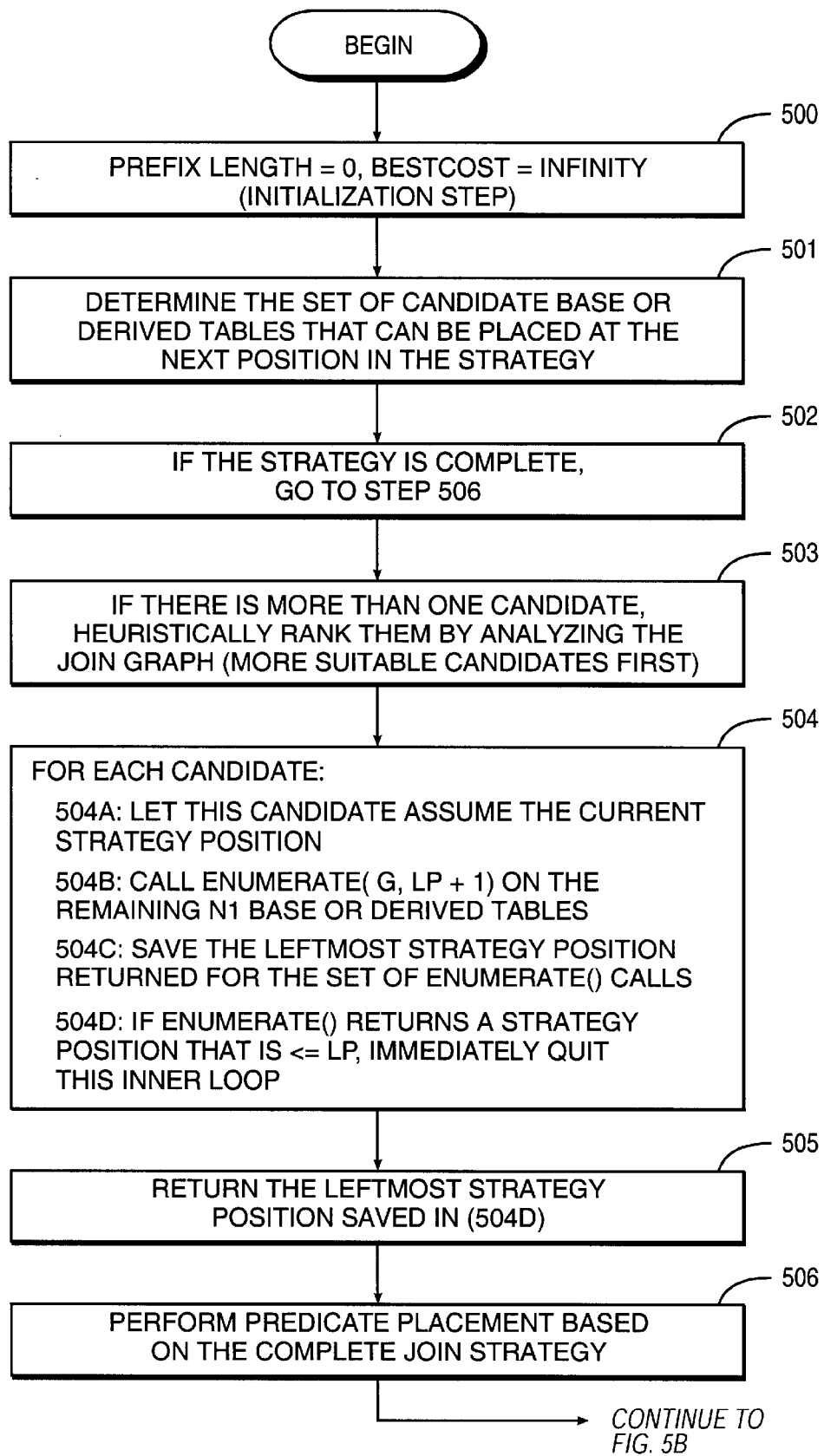
FIGS. 5A–B comprise a flowchart summarizing a join enumeration method of the present invention.
Figure 5B:
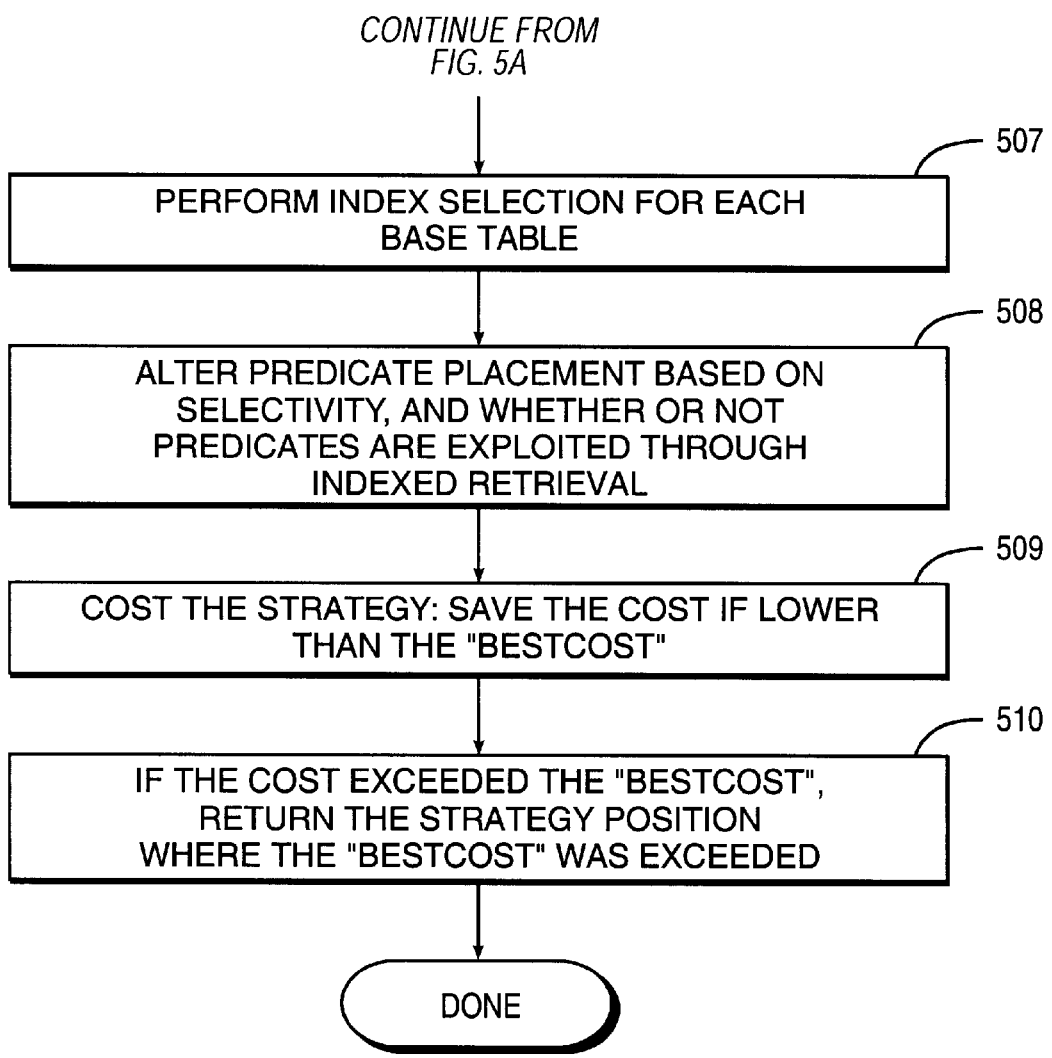

FIGS. 5A–B summarize a join enumeration method, Enumerate (G, Lp), performed in accordance with the present invention. Given a join graph G, and a prefix length Lp, the method determines the best join order for the remainder of the linear ordering of the vertices (tables) in G that constitute a left-deep processing tree. The steps are as follows.

500. Initialization step: prefix length=0, best-cost=infinity.
501. Determine the set of candidate base or derived tables that can be placed at the next position in the strategy.
502. If the strategy is complete, go to step (506).
503. If there is more than one candidate, heuristically rank them by analyzing the join graph (more suitable candidates first).
504. For each candidate:
504A: Let this candidate assume the current strategy position.
504B: Call Enumerate (G, Lp+1) on the remaining N−1 base or derived tables.
504C: Save the left-most strategy position returned for the set of Enumerate ( ) calls.
504D: If Enumerate( ) returns a strategy position that is <=Lp, immediately quit this inner loop.
505. Return the left-most strategy position saved in (504D).
506. Perform predicate placement based on the complete join strategy.
507. Perform index selection for each base table.
508. Alter predicate placement based on selectivity, and whether or not predicates are exploited through indexed retrieval.
509. Cost the strategy. Save the cost if lower than the best-cost.
510. If the cost exceeded the best-cost, return the strategy position where the best-cost was exceeded.

Figure 6:
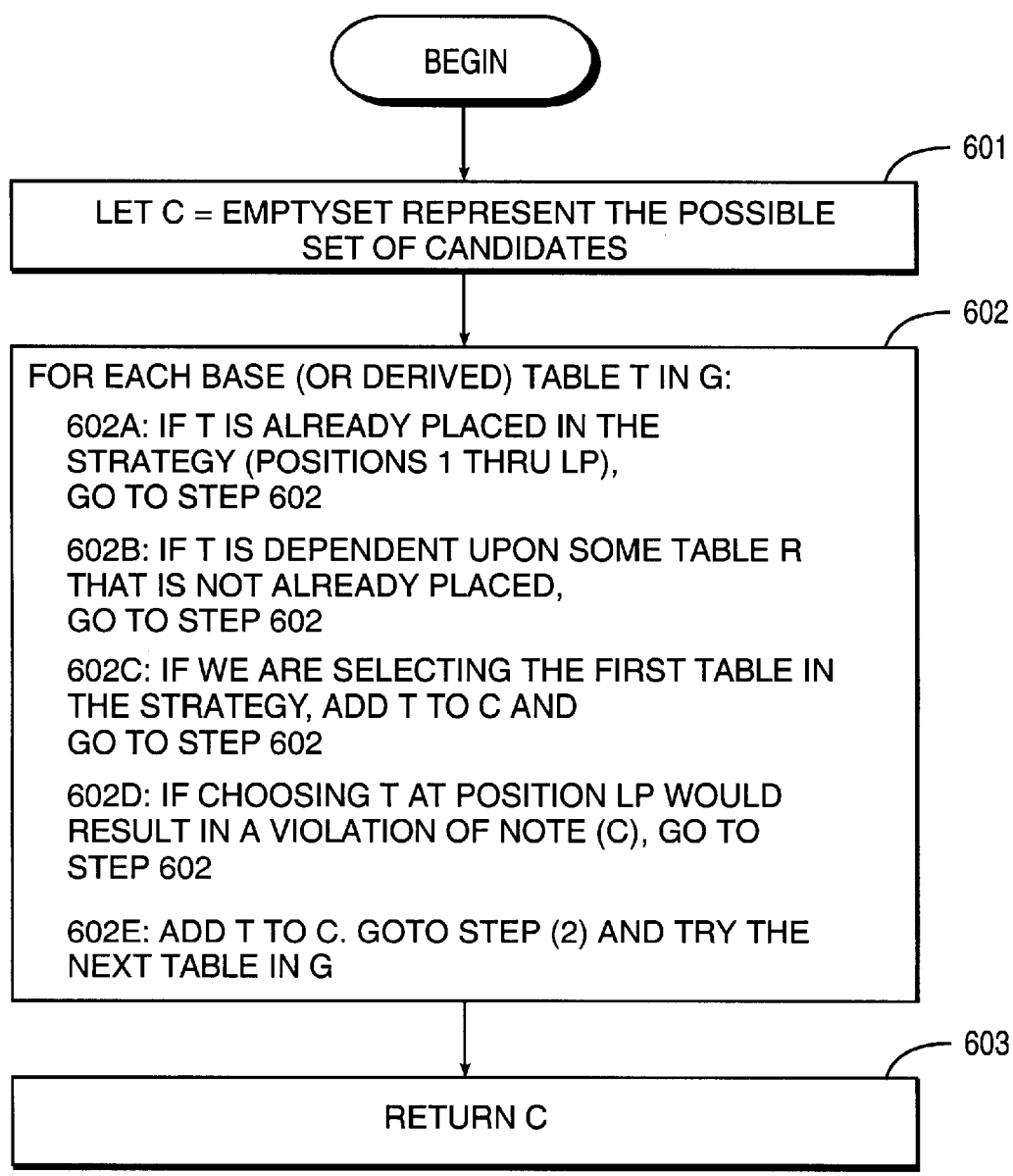
FIG. 6 is a flowchart summarizing a candidate-finding method of the present invention.

FIG. 6 summarizes a candidate-finding method, FindCandidates (G, Lp), performed in accordance with the present invention. The method, which takes a join graph G, and a strategy position Lp as inputs, returns a set of candidates that can be placed at the next position in the strategy (Lp+1). In the method, right outer joins are rewritten as left outer joins by swapping the two inputs. In processing a left outer join, each table on the preserved side of the left outer join must precede each table on the left outer join's null-supplying side. A dependency edge embodies this relationship. For nested outer joins, the dependencies follow for each level of nesting. Each table in the null-supplying side of an outer join must be placed contiguously in the join strategy, with no intervening tables from any other inner or outer join. The steps are as follows.

601. Let C=emptyset represent the possible set of candidates.
602. For each base (or derived) table T in G
602A: If T is already placed in the strategy (positions 1 thru Lp), go to step (2).
602B: If T is dependent upon some table R that is not already placed, go to step 602.
602C: If we are selecting the first table in the strategy, add T to C and goto step 602.
602D: If choosing T at position Lp would result in a violation of Note (C), go to step 602.
602E: Add T to C. Go to step 602 and try the next table in G.
603. Return C.

G. Conclusion

The assumptions inherent in the join enumeration method described in this paper make it less than suitable for some classes of queries. One such example is a query over a "star" schema where the optimal access plan contains one or more Cartesian products; however, it has been found that in practice such queries are relatively rare. On the other hand, since the customer base of SQL Anywhere is exceedingly diverse, the complexity of the customers' applications is no longer surprising. It is not unusual for SQL Anywhere customers to construct queries whose join degree is 15 or more. The current "record" (for join degree involving base tables only) for a single query specification in a production application is 43, though there have been cases (not confirmed) that queries with a join degree of 70–80 are in use. The optimization of such queries in the typical memory-constrained environment of an ASA server is possible only by the significant reduction of the search space through cost-based pruning. ASA's suite of rewrite optimizations includes the conversion of In-list predicates into inner joins with a virtual table comprised of the In-list values (with duplicates removed). While this can add to the join degree of the query—the current "record" for the number of such predicates in a single query is 36—the enumeration method is sufficiently cheap to make the optimization of such queries practical. A plan to extend ASA's join enumeration method to optimize expensive predicates in the same way, a technique already described in the literature but discounted for optimizers that rely on dynamic programming. A project currently underway is to refine the optimizer's cost model, to both improve its accuracy and effectively deal with different optimization goals (particularly useful for Top n queries). Addressing the issue of accuracy is difficult not only because ASA can operate under a variety of operating systems, but also because the file systems of each can mask the characteristics of the secondary storage device being used for the database files, whether it be a cached ultra-wide-SCSI disk or a RAM "disk" on a Windows CE device.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a relational database system, a method for determining an optimal join order for use in an access plan employed for executing a database query, the method comprising:

receiving a query specifying at least one join condition between two or more database tables;

establishing an initial join order, based on each table's size and join predicates between the tables, said initial join order specifying a particular sequence for accessing said tables, said sequence indicating a first join position specifying an outer table and one or more subsequent join positions specifying one or more successive inner tables;

determining a strategy cost for satisfying the query using a query access plan that employs said initial join order;

starting from the innermost positions of the join order and proceeding to be outermost position of the join order, evaluating other candidate join orders by swapping ordering of tables at a given position with those at subsequent positions and thereafter determining the cost strategy for that join order; and if a given candidate join order under consideration has a prefix ordering of outermost tables that has a cost strategy that is worse than that already obtained, then eliminating from consideration any candidate join orders having that prefix ordering of outermost tables; and selecting the candidate join order having the most favorable strategy cost.

* * * * *